Oct. 11, 1927.
DE SOTO E. RICHARDSON
1,645,115
WEEDING AND CULTIVATING IMPLEMENT
Filed Oct. 9, 1925     2 Sheets-Sheet 1
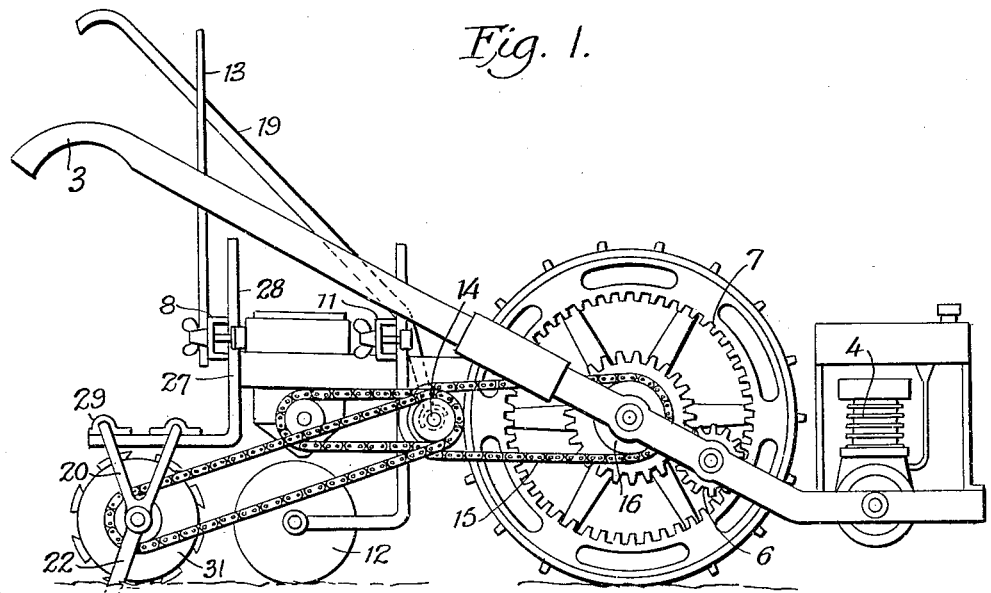
Fig. 1.
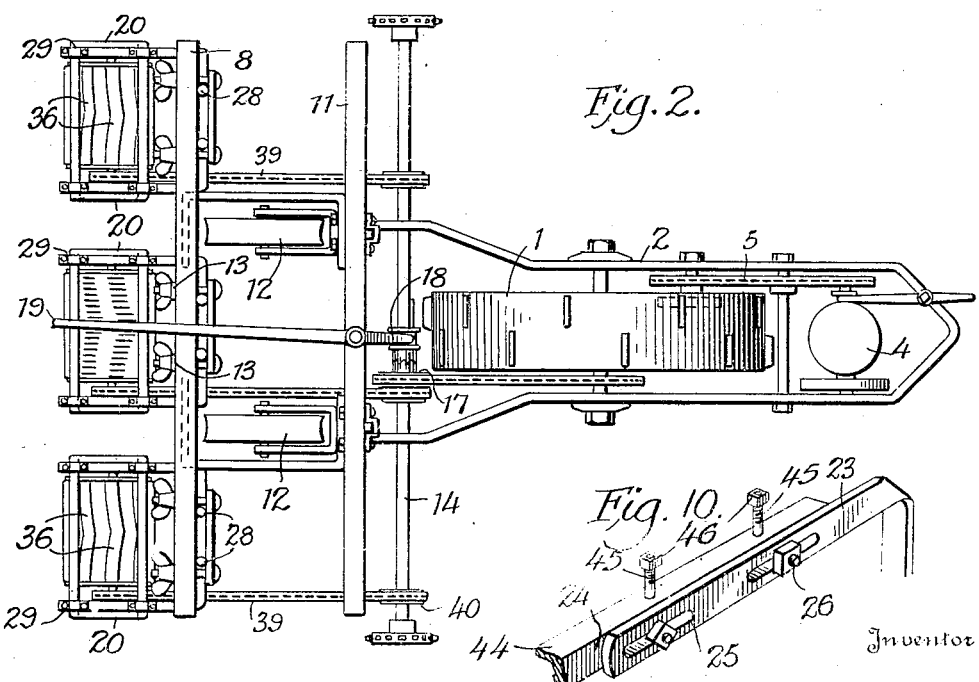
Fig. 2.
Fig. 10.
Inventor
De Soto E. Richardson,
By Lloyd W. Patch
Attorney Oct. 11, 1927.
1,645,115
DE SOTO E. RICHARDSON
WEEDING AND CULTIVATING IMPLEMENT
Filed Oct. 9, 1925    2 Sheets-Sheet 2
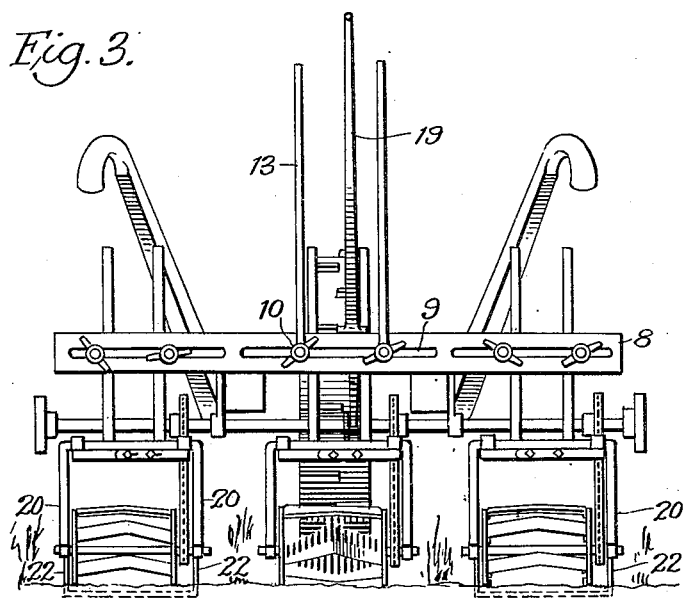
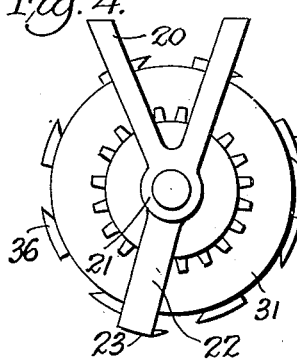
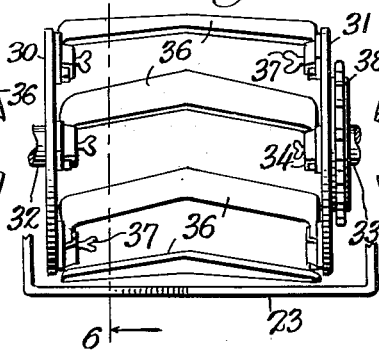
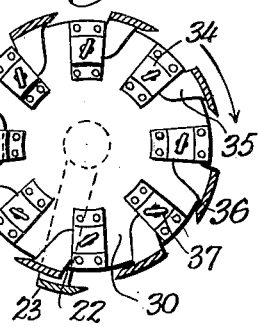
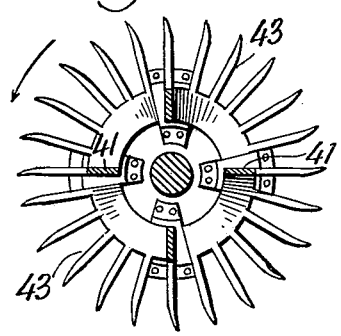
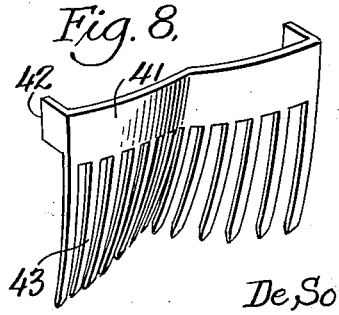
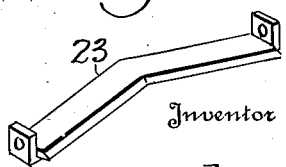

Patented Oct. 11, 1927.

1,645,115

UNITED STATES PATENT OFFICE.

DE SOTO E. RICHARDSON, OF RIVERSIDE, WASHINGTON.

WEEDING AND CULTIVATING IMPLEMENT.

Application filed October 9, 1925. Serial No. 61,580.

My invention relates to a weeding and cultivating implement, and particularly to an agricultural implement of this type adapted to rake and mulch the soil.

An object of this invention is to provide a weeding and cultivating implement which can be used with a minimum power effort or requirement to propel the same across a field.

Another object resides in so constructing the parts that the earth is loosened with a chopping or forking action and the weeder portions operate with a shearing action.

A further object is to provide a weeding and cultivating structure which can be mounted in gang arrangement upon a power implement, or which can be employed for hand propulsion.

Still another object is to so construct the parts that adjustments can be made to suit the implement for use between rows of plants spaced at different widths.

With the above and other objects in view, which will be apparent to those skilled in the art, my present invention includes certain novel features of construction and combinations of parts which will be set forth in connection with the drawings.

In the drawings:

Figure 1 is a view in side elevation of a power implement having my cultivator and weeder structure embodied therewith.

Fig. 2 is a top plan view.

Fig. 3 is a view in rear elevation.

Fig. 4 is a view in end elevation of one of the weeding and cultivating implements.

Fig. 5 is a view in side elevation.

Fig. 6 is a sectional view substantially on line 6—6 of Fig. 5.

Fig. 7 is a sectional view similar to Fig. 6 showing the mounting of fork blades on the cultivating head.

Fig. 8 is a view in perspective to better show one of the fork blades.

Fig. 9 is a view in perspective showing the undercutting blade.

Fig. 10 is a detail perspective view to better show the adjustment of the mounting frame.

As the parts are illustrated in Figs. 1, 2 and 3 the main supporting implement is a walking tractor of the single wheel type. The power wheel 1 has a frame 2 mounted on the axle thereof and handles 3 extend rearwardly. Internal combustion engine 4 is mounted on the forward end of the frame and is connected through sprocket chain 5 and pinion 6 working in internal gear 7, to drive the power wheel. An implement supporting bar 8 is mounted transversely and is horizontally disposed in the rear of power wheel 1, and this bar is provided with the elongated slots 9 to receive clamp bolts 10 by which implements are supported.

A frame bar 11 is provided adjacent implement bar 8 and carrying wheels 12 are associated with this frame bar to be disposed in the rear of power wheel 1. These carrying wheels 12 can be mounted for vertical adjustment through hand lever 13 and any of the well known arrangements of levers and links, so that the wheels can be raised and lowered to vary the elevation to which the implement bar 8 is carried. In the present instance I have shown the power and frame portions to be of substantially the type illustrated in my co-pending application Serial No. 700,652, and the several portions may be assembled and can be provided with the control mechanism as illustrated in this application. A shaft 14 is journaled transversely in the frame portion in the rear of power wheel 1 and a sprocket chain 15 fitted over sprocket wheel 16 and sprocket wheel 17 on the shaft 14 causes this shaft to be revolved at a relatively higher speed than power wheel 1. A clutch 18 is provided on shaft 14 to be operated by hand lever 19 for controlling the rotation of shaft 14.

My cultivating and weeding implements are to be mounted upon and carried by the implement supporting bar 8 through the medium of implement clamping bolts 10, and these bolts are adjustable within slots 9 to vary the settings of the cultivating and weeding implements to clear rows of plants, after the manner shown in Fig. 3. In this adaptation I have illustrated the mounting and use of three sets of weeding and cultivating implements, but it will be appreciated that a greater or lesser number might be employed.

The weeding and cultivating implements consist of the supporting frame 20 having bearing portions 21 at opposite sides and provided with downwardly extending arms 22 to carry the substantially V-shaped undercutting knife 23. This undercutting knife 23 is adapted to cut with a diagonal or clamping stroke and frictional resistance is thus greatly reduced when the implement is in use. It is perhaps preferable that the supporting frame members be adjustable as shown in Fig. 10, so that the spread or width of settings of the side portions thereof can be varied, and in this adaptation the side bars of the supporting frames 20 are provided with extensions 23 and 24 adapted to lie in overlapping relation and provided with elongated slotted openings 25 which register to receive clamping bolts 26 by which adjustments are secured and held.

The substantially L-shaped supporting brackets 27 are provided with upwardly extending arms 28 to be engaged by the clamp bolts 10 and have clips 29 to receive the bars 23 and 24 of the frame portions 20. These stems 28 are adjustable vertically to vary the depth to which the undercutting blades 23 will be carried and will cut.

A cutter head is revolubly mounted within the frame 22, and consists of end disks or plates 30 and 31 having bearing pintles 32 and 33 extending therefrom to be revolubly received within the bearings 21 at the sides of the frames 20. These disks are each provided on their inner side with clips 34 adapted to receive the bent ends 35 of cultivating knife 36, and set screws 37 are provided in conjunction with the clips to clamp the bent ends and rigidly secure the cultivating knife in place. This securement of the cultivating knife around the peripheries of the end disks 30 and 31 will form the complete cultivating head, and the cultivating knives 36 are so disposed that they work adjacent the undercutting knife 23 when the cultivating head is revolved. It is preferable that these knives 36 be substantially V-shaped in their longitudinal extent, as shown in Fig. 5, so that they will have a diagonal or shearing cut with respect to the knife 23.

A sprocket wheel 38 is provided on one of the end disks or plates of the cultivator head and sprocket chain 39 is fitted over this sprocket wheel and over a sprocket wheel 40 on the shaft 14 so that as this shaft 14 is revolved, with the mounting of the parts as shown in Figs. 1, 2 and 3, the cultivator head will be revolved at a speed correspondingly higher than the speed of revolution of power wheel 1. Revolution of the cultivator head is in the direction indicated by the arrow in Fig. 6, and the speed of revolution is calculated to be relatively greater than the speed of travel of the machine so that the cultivator blades 36 will cut into the soil adjacent the undercutting knife 23 as the machine is propelled across a field between rows of plants.

In the present instance I have shown three of the cultivator heads mounting to work adjacent and between the rows of plants, but this arrangement might be varied and a greater or lesser movement might be employed. Also, different lengths of undercutting blades or knives 23 and cultivating blades or knives 36 can be substituted and variations can thus be made to suit different spacings between the rows of plants. The gearing wheels 12 will be spaced to clear the plants or these wheels can be so mounted that they can be raised or shifted out of the way when the implement is in use.

In Fig. 7 I have shown the substitution of fork blades 41 for the cultivating blades or knives 36, and these fork blades will be assembled with their ends 42 held by the clips 34, the fork prongs 43 being then disposed to extend substantially radially with respect to the center of revolution. The fork blades 41 can be formed to be substantially V-shaped to reduce frictional resistance when in use.

The cultivating heads and undercutting knives can be employed with power or propelled implements and supporting structures of various types, and the unit as illustrated in Figs. 4 and 5 might also be used as a hand implement, with a pushing or propelling handle extending from the frame structure 20, but I have found it advantageous to mount the cultivator heads in such connections and arrangements that they will be revolved adjacent the undercutting knives 23 as the knives are pushed or moved through the soil. Where the earth or soil is of hard or packed consistency, and where quantities of weeds are encountered, it may be found desirable to employ one or several of the fork blades 41 in conjunction with the one or several of the cultivator blades 36, and in some connections I have found that these blades can be alternated in their mounting around the peripheries of the disks 30 and 31 to operate to advantage. Vine or plant guards of any construction and type can be employed adjacent the sides of the cultivating implements, and as such guards are of common and well known construction I have not deemed it necessary to here illustrate application of the same.

As illustrated in Figure 10, it is preferable that the extension 24 be provided with a flange 44, and the stub bolts 45 are carried by this flange to be slipped under the bridge of a tool carrying member to mount the same upon the frame. Securing nuts 46 are provided on these bolts 45.

While I have herein shown and described only certain specific embodiments of my present invention and have suggested only certain possible modifications in the form, construction and assembly of the parts and in the uses of the implement, it will be appreciated that changes and variations can be made without departing from the spirit and scope of my invention.

I claim:

1. A weeding and cultivating implement comprising a substantially V-shaped knife, and a cultivating head revolubly mounted adjacent said knife provided with substantially V-shaped blades.

2. A weeding and cultivating implement comprising a substantially V-shaped knife, a cultivating head revolubly mounted adjacent said knife provided with substantially V-shaped blades, and means to revolve the cultivating head at a peripheral speed greater than the rate of travel when in use.

3. A weeding and cultivating implement comprising a supporting frame to travel across a field, an implement frame provided with bearings at its ends, an undercutting knife of substantially V-shaped form carried by the implement frame, a cultivating head revolubly mounted in the bearings of the implement frame provided with substantially V-shaped blades, and means adjustably supporting said implement frame from the supporting frame.

4. A weeding and cultivating implement comprising a frame provided with spaced bearings, a pair of disks having bearing pintles to be revolubly mounted in the bearings, a substantially V-shaped undercutting blade carried by the frame, a plurality of substantially V-shaped blades to be mounted between the disks to form a cultivating head, and means to hold said blades removably associated with the disks.

5. A weeding and cultivating implement comprising a supporting frame, a wheel on which said frame is mounted to travel across a field, a plurality of implement frames carried by the supporting frame mounted for vertical adjustment, substantially V-shaped undercutting knives carried by the implement frames, cultivator heads revolubly mounted in the implement frames adjacent the undercutting knives and provided with substantially V-shaped blades, and driving connections from the wheel to said cultivator heads to rotate the same at a peripheral speed greater than the rate of travel of the implement across the field.

In testimony whereof I hereunto affix my signature.

DE SOTO E. RICHARDSON.